United States Patent [19]

White

[11] Patent Number: 4,500,995
[45] Date of Patent: Feb. 19, 1985

[54] BROMINE ANTI-STOKES RAMAN LASER
[75] Inventor: Jonathan C. White, Lincroft, N.J.
[73] Assignee: AT&T Bell Laboratories, Murray Hill, N.J.
[21] Appl. No.: 490,783
[22] Filed: May 2, 1983
[51] Int. Cl.[3] .............................................. H03F 7/00
[52] U.S. Cl. ........................................ 372/3; 307/425; 307/426; 372/89; 372/39; 372/5
[58] Field of Search ................ 372/3, 39, 89; 307/425, 307/426; 378/5

[56] References Cited

U.S. PATENT DOCUMENTS

| 3,815,043 | 6/1974 | Carman, Jr. et al. | 331/94.5 |
| 4,144,464 | 3/1979 | Loree et al. | 307/88.3 |
| 4,151,486 | 4/1979 | Itzkan et al. | 331/94.5 |
| 4,213,060 | 7/1980 | Byer et al. | 307/426 |
| 4,218,628 | 8/1980 | Harris | 307/426 |
| 4,239,995 | 12/1980 | Feldman et al. | 307/426 |

OTHER PUBLICATIONS

White et al., "Tuning and Saturation Behavior of the Anti-Stokes Raman Laser", Opt. Lett. vol. 8, No. 1, Jan. '83.
White et al., "Tunable, 178-nm Codine Anti-Stokes Raman Laser", Opt. Lett. vol. 7, No. 5, May 1982.
White et al., "Branching Ratios for TlBr Photodissociation with 2660 Å radiation", J. Chem. Phys. 69 (5), Sep. 1, 1978.
"Efficiency Studies of the Thallium Anti-Stokes Raman Laser", IEEE Journal of Quantum Electronics, vol. QE-18, No. 6, Jun. 1982, p. 941, J. C. White et al.
"Anti-Stokes Raman Laser", Physical Review A, Feb. 1982, p. 1226, J. C. White et al.
"Photofragmentation of Thallium Halides", Chemical Physics, vol. 55, 1981, p. 371, N. J. A. Van Veen et al.
"Laser UV Photofragmentation of Halogenated Molecules, Selective Bond Dissociation and Wavelength-Specific Quantum Yields for Excited I($^2P_{\frac{1}{2}}$) and Br($^2P_{\frac{1}{2}}$) Atoms", Physical Chemistry, vol. 85, No. 25, 1981, p. 3845, W. H. Pence et al.
"High Efficiency KrF Excimer Flashlamp", Optics Communications, vol. 35, Nov. 1980, p. 242, T. Gerber et al.
"Tunable Coherent Radiation Source Covering a Spectral Range from 185 to 880 nm", Applied Physics, vol. 18, 1979, p. 177, V. Wilke et al.
"Alkali-Metal Resonance-Line Lasers Based on Photodissociation", Applied Physics Letters, vol. 34, May 1979, p. 655, D. J. Ehrlich et al.
"Tunable UV-Radiation by Stimulated Raman Scattering in Hydrogen", Applied Physics, vol. 16, 1978, p. 151, V. Wilke et al.
"Electronic Resonance Enhancement of Coherent Anti-Stokes Raman Scattering", Physical Review A, vol. 18, Oct. 1978, p. 1529, S. A. J. Druet et al.
"Inversion of the Na Resonance Line by Selective Photodissociation of NaI", Applied Physics Letters, vol. 33, Aug. 1978, p. 325, J. C. White.
"Anti-Stokes Emission as a VUV and Soft X-Ray Source", Picosecond Phenomena, 1978, S. E. Harris et al.
"Resonant CARS in $I_2$ Vapor", Optics Communication, vol. 24, Jan. 1978, p. 77, B. Attal et al.
"Observation of Stimulated Anti-Stokes Raman Scattering in Inverted Atomic Iodine", Physical Review Letters, vol. 33, Jul. 1974, p. 190, R. L. Carman et al.
"Ultraviolet Absorption Cross Sections for the Alkali Halide Vapors", The Journal of Chemical Physics, vol. 46, Apr. 1967, p. 2968, P. Davidovits et al.

Primary Examiner—William L. Sikes
Assistant Examiner—Léon Scott, Jr.
Attorney, Agent, or Firm—Erwin W. Pfeifle; Wendy W. Koba

[57] ABSTRACT

An anti-Stokes Raman laser which uses a metastable level of bromine is provided. A medium of molecules each of which contains at least one bromine atom is provided. Means are provided for dissociating the bromine atom from the molecules so that a majority of dissociated bromine atoms go into at least one excited metastable state. Means are provided for jumping the bromine atoms in the metastable state with pump photons in order to provide anti-Stokes Raman output photons by transition from the metastable state to a final state. The output photons have energy equal to the pump photon energy plus an energy gain given by the energy difference between the metastable state and the final state.

10 Claims, 6 Drawing Figures

BROMINE ANTI-STOKES RAMAN LASER

BACKGROUND OF THE INVENTION

1. Field of the Invention

This invention relates to tunable vacuum ultraviolet (VUV) sources of coherent radiation in the 150 nm spectral range, and more particularly to stimulated anti-Stokes Raman lasing from an inverted metastable population in atomic bromine.

2. Description of the Prior Art

In recent years tunable sources of incoherent as well as coherent radiation in the VUV spectral range have been developed.

One such method as disclosed in Harris et. al. in their article entitled "Anti-Stokes Emission as a VUV and Soft X-Ray Source", published in the book *Picosecond Phenomena*, edited by Schank et. al., Springer-Verlag, Berlin, N.Y., 1978. Harris et. al. describe spontaneous Raman emission of incoherent radiation from the 2s $^1$S excited state of He using the principle of four-wave parametric mixing. The 2s $^1$S He metastable state was produced and inverted by glow discharge. A Nd:YAG laser operating at 1.064 $\mu$m produced Stokes and anti-Stokes spontaneous emission at 63.7 nm and 56.9 nm, respectively. They also suggest using the above He Raman flashlamp source to remove inner shell electrons in K in either one step or in two steps in order to produce excited states of $K^+$ from which lasing may be induced, such as the 60.1 nm line of $K^+$.

Druet et. al. in their paper entitled "Electronic Resonance Enhancement of Coherent anti-Stokes Raman Scattering", published in *Physical Review A*, Vol. 18, p. 1529, October 1978, give a theoretical treatment of coherent anti-Stokes stimulated Raman scattering involving two photon absorption from the exciting laser beam. a metastable state is produced and a pump beam is tuned near a dipole absorption transition from the metastable level to a virtual intermediate level. Druet et. al. provide theoretical background in the resonantly enhanced coherent anti-Stokes Raman process.

Wilke et. al. in their article "Tunable Coherent Radiation Source Covering a Spectral Range from 185 to 800 nm", published in the journal *Applied Physics*, Vol. 18, p. 177, 1979, disclose the use of nonresonant stimulated Raman anti-Stokes upconversion using the vibrational levels of molecular hydrogen. They used H$_2$ gas and a variety of tunable dye lasers to generate anti-Stokes coherent Raman radiation up to 185 nm. Wilke et. al. make use of a four-wave mixing process for the anti-Stokes Raman upshift and do not produce an inverted metastable population. The four-wave mixing process used by Wilke et. al. makes use of the nonlinear properties of the medium. No metastable population inversion is produced. Output anti-Stokes light is produced only in the forward direction, and then only along phase matched cones. In four-wave mixing, the process depends upon the nonlinear susceptibility of the material.

White et. al. in an article "Anti-Stokes Raman Laser", published in *Physical Review A*, Vol. 25, p. 1226, February 1982, disclose a Tl vapor resonantly enhanced stimulated Raman anti-Stokes laser. They populated the 6p $^2P_{3/2}°$ level of Tl selectively with respect to the corresponding 6p $^2P_{\frac{1}{2}}°$ ground state by photodissociation of TlCl, and obtained stimulated anti-Stokes Raman emission from the $^2P_{3/2}°$ level using pump beams of both the second and third harmonics of a Nd:YAG laser. They provided anti-Stokes Raman output of 376 nm and 278 nm by tuning the pump beam for resonant enhancement by an intermediate dipole transition.

Loree et. al., in U.S. Pat. No. 4,144,464 issued March 1979, teach an anti-Stokes four-wave mixing device using energy levels of H$_2$, D$_2$, HD, CH$_3$, and N$_2$.

In none of the prior art has the problem of providing a high power tunable laser which provides VUV radiation in the 150 nm range been solved.

SUMMARY OF THE INVENTION

The problem of providing a lasing source of coherent radiation in the vacuum ultraviolet (VUV) region of the spectrum near 150 nm is solved in accordance with the present invention. The present invention teaches a stimulated anti-Stokes Raman upshift from the bromine (Br) metastable 4p$^5$ $^2P_{\frac{1}{2}}°$ level at 3685 cm$^{-1}$ using a pump lightwave of 157 nm provided by a fluorine F$_2$ laser. The bromine metastable population is produced by photodissociation of molecules containing Br such as alkali bromides, organo bromides, or thallium bromide. A high intensity pump lightwave produces a coherent lasing output lightwave, by means of the stimulated anti-Stokes Raman effect.

Other and further aspects of the present invention will become apparent during the course of the following description and by reference to the accompanying drawings.

DESCRIPTION OF THE PREFERRED EMBODIMENTS

Figure 1:
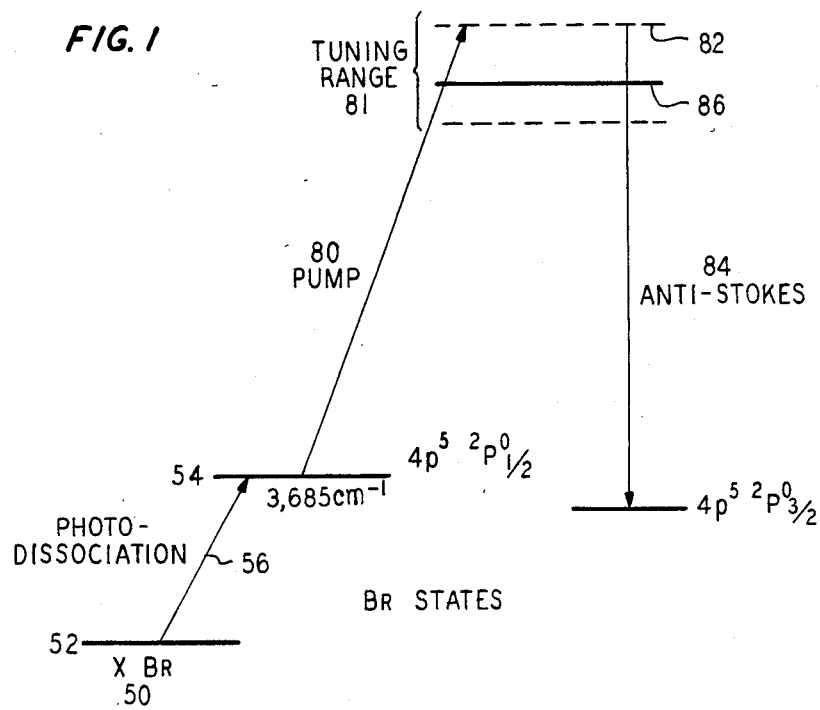
FIG. 1 is an energy level diagram of atomic bromine showing an anti-Stokes Raman transition.

Referring to FIG. 1, there is shown an energy level diagram which shows both atomic bromine energy levels and a molecular bromine energy level. A molecule containing Br, designated XBr 50, is initially in energy level 52. A photon absorbed by the molecule XBr 50 dissociates the Br atom from the molecule XBr 50. The dissociated Br atom is produced predominantly in an excited state, the 4p$^5$ $^2P_{\frac{1}{2}}°$ state 54 at an energy of 3685 cm$^{-1}$, when the photodissociation photons are centered around an appropriate transition energy. An appropriate transition energy for NaBr molecules is provided by photons centered around a wavelength of 250 nm. A KrF flashlamp or a KrF laser provides a convenient source of photons centered around a wavelength of approximately 250 nm. The 250 nm wavelength KrF photons are particularly well suited for photodissociating NaBr into bromine atoms in the excited 4p$^5$ $^2P_{\frac{1}{2}}°$ state. Background information on the selective production of atomic excited species by photodissociation is given in the references: Dividovits et. al., in their article "Ultraviolet Absorption Cross Selections for the Alkali Halide Vapors", published in *The Journal* of *Chemical Physics*, Vol. 46, p. 2968, April 1967; and Pence et. al., in their article "Laser UV Photofragmentation of Halogenated Molecules. Selective Band Dissociation and Wavelength-Specific Quantum Yields for Excited I($^2P_{\frac{1}{2}}$) and Br($^2P_{\frac{1}{2}}$) Atoms", published in *Journal of Physical Chemistry*, Vol. 85, p. 3844, 1981. Background information on a KrF flashlamp is given by the reference Gerber et. al. in the article "High Efficiency KrF Excimer Flashlamp", in the journal *Optics Communication*, Vol. 35, p. 242, November 1980.

A majority of atoms of Br removed from the molecule XBr by photodissociation may be produced in the $4p^5$ $^2P_{\frac{1}{2}}°$ state 54 by an appropriate choice of wavelength for the photons causing photodissociation. Arrow 56 shows the transition for molecular bromine XBr 50 to excited state bromine in the $4p^5$ $^2P_{\frac{1}{2}}°$ state 54 at frequency 3685 cm$^{-1}$.

Figure 2:
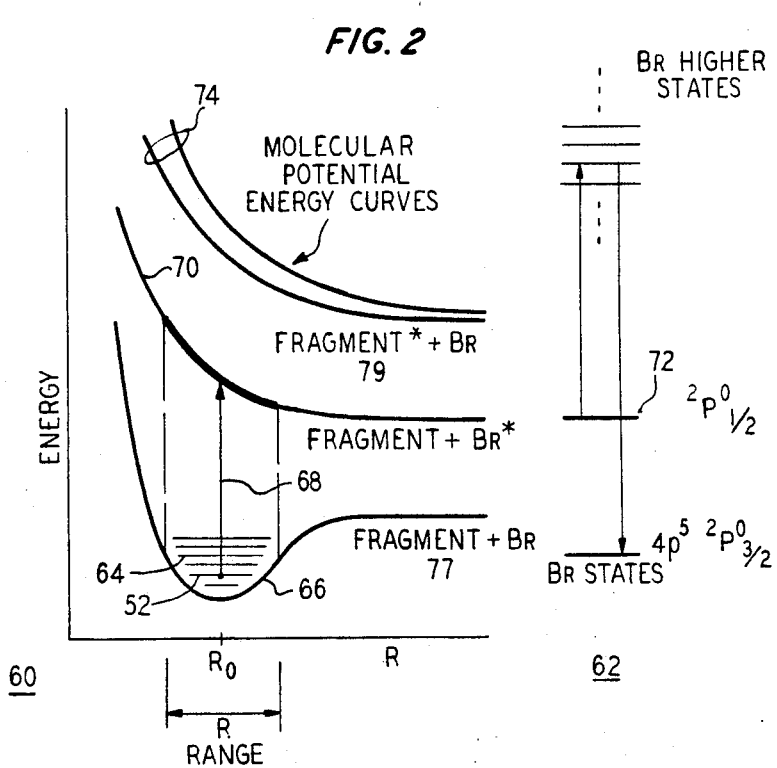
FIG. 2 is a schematic diagram of molecular energy levels of NaBr showing photodissociation into excited bromine atoms.

The photodissociation process by which a Br atom is selectively produced in an excited state may be examined in more detail by reference to FIG. 2. Referring to FIG. 2, there are shown both molecular energy levels 60 for a molecule containing bromine, as drawn for a typical molecule such as NaBr, and a few energy levels of the excited states of atomic bromine 62. The molecule containing bromine, XBr 50, for example NaBr, is initially in a vibrational state formed in the ground state molecular orbital potential well 66. The vibrational states 64 are normally statistically populated by thermal excitation. One of the vibrational states 64 provides the initial state 52 for photon absorption. Transition 68 is induced by photo-absorption and carries the molecule to an excited state 70 in which the other atoms, for example Na, are not excited but the bromine atom is excited, as is indicated by the legend "fragment+Br*". The symbol Br* represents an excited bromine atom. The fragment may be, for example, a Na atom, or may be Tl, or may be an organic molecule, or K, etc. The molecular wavefunction for excited state 70 is repulsive and as a result the molecule separates into a fragment, for example a Na atom, and an excited Br atom in the $4p^5$ $^2P_{\frac{1}{2}}°$ state 72. Other excited molecular states 74 are available, but the state 70 which dissociates into a Br* atom in the $4p^5$ $^2P_{\frac{1}{2}}°$ state 72 is selectively produced by selection of the photon energy. For a NaBr molecule the photons of a KrF flashlamp or laser which are centered around a 250 nm wavelength are particularly suitable for selectively producing Br* atoms in the $4p^5$ $2P_{\frac{1}{2}}°$ state. It is to be understood that potential energy curves similar to FIG. 2 describe the molecular excited states of many Br-containing molecules. In particular, molecules of $Br_2$, $C_2F_5Br$, $1,2-C_2F_4IBr$, $CF_3Br$, RbBr, CsBr, KBr, LiBr, as well as NaBr, may be selectively dissociated into a free Br atom in the $4p^5$ $^2P_{\frac{1}{2}}°$ excited state by photodissociation. Also other organic molecules containing bromine, referred to as organo bromides, may be selectively photo-dissociated to form a free excited bromine atom in the $4p^5$ $^2P_{\frac{1}{2}}°$ state.

Other dissociation possibilities include both the Br and the fragment in their respective ground states 77, and the Br atom in its ground state with the fragment in an excited state 79. The fragment in an excited state 79 is indicated as "fragment*".

Referring to FIG. 1, the population of Br atoms in the $4p^5$ $^2P_{\frac{1}{2}}°$ state 54 which are produced by photo-dissociation of a Br-containing molecule are pumped by a coherent light beam 80. For example, the approximately 157 nm wavelength photon produced by a fluorine $F_2$ laser is particularly useful as a pump beam 80. A pump photon beam 80 of approximately 157 nm wavelength induces a virtual transition in the atom to a virtual level 82 with an energy of approximately 67,185 cm$^{-1}$. Virtual level 82 is reached by adding the energy 63,500.0 cm$^{-1}$ of the approximately 157 nm photons to the energy 3,685 cm$^{-1}$ of the $4p^5$ $^2P_{\frac{1}{2}}°$ state 54 for a total of 67,185 cm$^{-1}$. Virtual level 82 then decays with the emission of a 149 nm wavelength photon 84 with energy of 67,185 cm$^{-1}$ to the Br ground state $4p^5$ $^2P_{3/2}°$ state. This process of absorption of a photon by an atom in an excited state and the consequent emission of a photon with an energy gain is known as the anti-Stokes Raman effect. The bromine atom has an excited $5s^2$ $^2P_{3/2}$ state 86 at 67,177 cm$^{-1}$ which is only about 8 cm$^{-1}$ from virtual state 82. The state 86 causes a resonant enhancement of the anti-Stokes Raman effect and so increases the cross section for the anti-Stokes Raman effect.

The gain of a medium containing the metastable $4p^5$ $2P_{\frac{1}{2}}°$ bromine atoms may be made great enough that lasing with an output of 149 nm photons occurs without the need to provide mirrors at 149 nm in order to increase the gain.

Lasing may be achieved by a medium in an inverted metastable population through anti-Stokes Raman processes if the quantity b, defined below, equals or exceeds a threshold value. The threshold value is approximately 30 when b is computed using the system of units given below. The quantity b is defined by the expression:

$$b = N\sigma_g L I \qquad (1)$$

where the quantities are defined as:

N = population inversion in the units of excited states/cm$^3$ $\sigma_g$ = Raman gain cross section in the units cm$^4$/Watt L = optical length of the medium in cm I = intensity of the pump laser in units Watt/cm$^2$ The Raman gain cross section $\sigma_g$ is determined by the atomic states of the medium and the frequency of the pump laser. Hence the Raman gain cross section $\sigma_g$ is a constant of the system after the pump laser frequency is chosen. The other factors N, L, and I may be adjusted to achieve lasing. For example, the optical length of the medium L may be increased by placing mirrors around the medium. The population inversion N may be increased by increasing the intensity of the photodissociation light source; or may be modified by reducing the collisional de-excitation of the metastable state by reducing the pressure of the medium, but a pressure reduction also reduces the number of atoms present in the system. The intensity I of the pump laser may be adjusted to bring b below the threshold, or increased to bring b above threshold. With the intensity I of the pump beam below threshold the medium will emit anti-Stokes Raman light in all directions as incoherent light. As the intensity I is increased to above threshold, lasing begins and a coherent output beam of anti-Stokes Raman photons develops. The coherent output beam develops as a single spot type beam in both the forward and backward direction relative to the direction of the pump beam.

Figure 3:
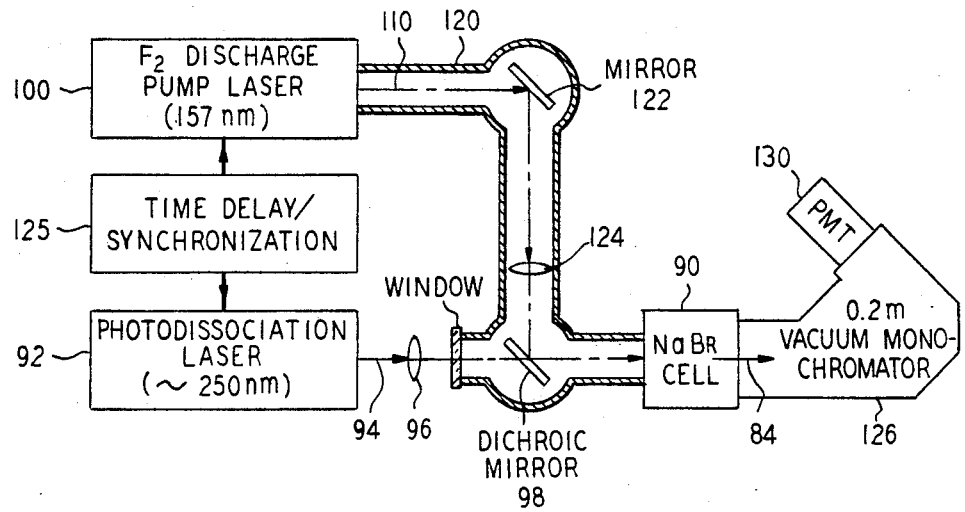
FIG. 3 is a ray diagram of an embodiment of the invention using a NaBr medium.

An embodiment of the invention using NaBr as the medium for anti-Stokes Raman lasing was constructed. Referring to FIG. 3, there is shown a ray diagram of an exemplary embodiment of the invention using a NaBr medium. A quantity of NaBr is placed within NaBr cell 90, the cell evacuated, and the temperature raised to produce a vapor of NaBr. A temperature of approximately 900° C. has been found to produce a vapor density of approximately $10^{17}$ molecules/cm$^3$ at a partial pressure of approximately 3 torr. A buffer gas was introduced into NaBr cell 90 in order to prevent the NaBr medium from condensing out on the windows (not shown) of NaBr cell 90. A buffer gas must not react chemically with the NaBr medium or its photofragments. A buffer gas of argon at a partial pressure of 30 to 50 torr has been found to be satisfactory. Also a buffer gas of He, Ne, Xe, or Kr performs satisfactorily, as should any gas which does not react chemically with the medium or its photofragments.

Figure 4:
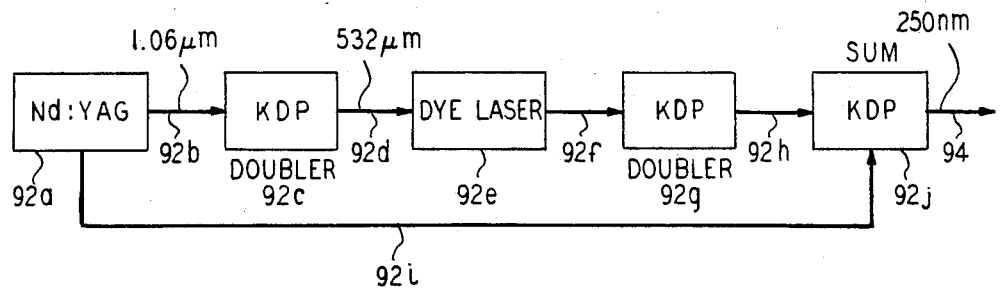
FIG. 4 is a ray diagram showing frequency upshift of a Nd:YAG laser output to substantially 250 nm.

A photodissociation laser 92 with an output wavelength centered around 250 nm was made using a Nd:YAG laser, 92a FIG. 4, with a 1.06 μm output. Referring to FIG. 4, first the 1.06 μm light beam 92b was doubled using a first KDP crystal 92c to 0.532 μm. Second, the 0.532 μm light beam 92d was used to pump a dye laser 92e which used the dye DCM. Third, the dye laser output 92f was doubled using a second KDP crystal 92g. Fourth, the output 92h from the second KDP crystal 92g was mixed with a 1.06 μm beam 92i from the Nd:YAG laser 92a using a third KDP crystal 92j to form the output light beam 94 centered around 250 nm. The 250 nm light beam was used to photodissociate the NaBr molecules selectively to produce the Br* $4p^5$ $^2P_{\frac{1}{2}}°$ state.

Referring again to FIG. 3, a fluorine $F_2$ discharge laser operating at an output wavelength of approximately 157 nm was used as the pump laser 100.

As an alternative embodiment for the photodissociation light source, a KrF flashlamp or a KrF laser could be employed. A KrF light source is particularly well suited as a photodissociation light source for NaBr because it provides a light output centered around 250 nm. And a photodissociation of NaBr using 250 nm light selectively produces the $4p^5$ $^2P_{\frac{1}{2}}°$ metastable state. A photodissociation laser 92 produces light beam 94 centered about a wavelength of 250 nm. Light beam 94 is focused by lens 96, passes through dichroic mirror 98 and comes to a focus within NaBr cell 90. Dichroic mirror 98 is chosen to be substantially transparent at a wavelength of 250 nm, and to be substantially reflecting at a wavelength of 157 nm. A commercially available mirror using aternate layers of dissimilar dielectrics was found to be satisfactory.

The fluorine $F_2$ discharge pump laser 100 produces an output light beam 110 at approximately 157 nm. Light beam 110 travels in evacuated chamber 120. The evacuated chamber 120 provides an air-free path in order to prevent air absorption of light beam 110 photons of 157 nm wavelength. Light beam 110 is reflected by mirror 122, focused by lens 124, reflected by dichroic mirror 98, and comes to a focus within NaBr cell 90. Time delay synchronization unit 125 provides synchronization between photodissociation laser 92 and fluorine $F_2$ discharge pump laser 100 so that light beam 94 and light beam 110 are both present in NaBr cell 90 during the same time interval. Also light beams 94 and 110 are adjusted to overlap in space within NaBr cell 90. Therefore both space and time overlap of light beams 94 and 110 is achieved in the NaBr vapor within NaBr cell 90. The anti-Stokes Raman output photon 84, as shown in FIG. 1, enters the 0.2 meter vacuum monochromator 126. A movable diffraction grating serves to provide dispersion for the various wavelength photons which enter vacuum monochromator 126. Photomultiplier (PMT) 130 serves as a detector for monochromator 126.

Monochromator 126 serves to measure the output light spectrum of NaBr cell 90. Lasing of output photon 84 is achieved when the system is operated with the parameters given below.

Typical values of operating parameters which provide satisfactory anti-Stokes Raman lasing at 149 nm are: N, the population inversion density of $4p^5$ $^2P_{\frac{1}{2}}°$ state, $4 \times 10^{15}$ excited state/cm$^3$; $\sigma_g$, the Raman gain cross section, $8 \times 10^{-23}$ cm$^4$/watt; L, the optical length, 25 cm; and I, the intensity of the pump laser, $10^7$ W/cm$^2$. The threshold intensity for the pump laser was found to be approximately $0.3 \times 10^7$ W/cm$^2$ without the use of mirrors. A photon conversion efficiency of 20 percent to 30 percent may be achieved in the exemplary embodiment of the invention shown in FIG. 3, which means that one anti-Stokes output photon 84 may be produced for between 3 and 5 input pump photons in beam 110 of 157 nm wavelength.

An alternative embodiment of the invention may be made by making use of the storage capability of the Br* $4p^5$ $^2P_{\frac{1}{2}}°$ metastable state 54. In this alternative embodiment, time delay synchronization unit 125 is adjusted to provide 157 nm pump light beam 110 after photodissociation light beam 94 is extinguished. A pump light beam 110 delay of a few tens of nanoseconds provides satisfactory anti-Stokes Raman lasing at 149 nm.

Figure 5:
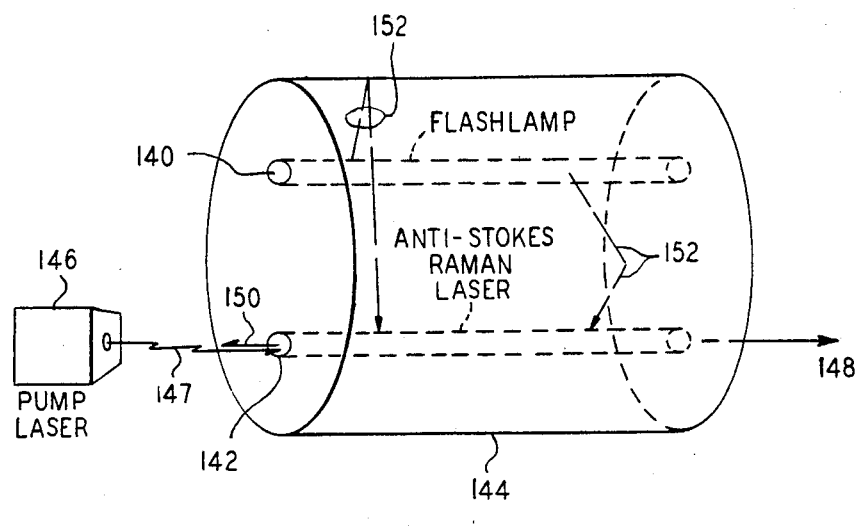
FIG. 5 is a schematic diagram of a confocal reflector laser.
Figure 6:
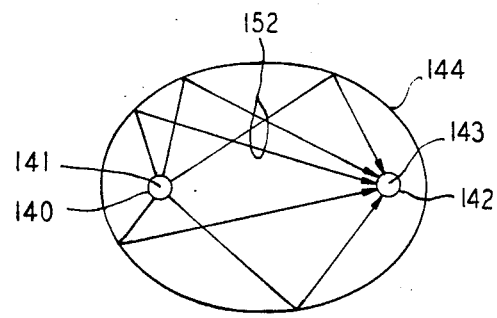
FIG. 6 is a cross section through a confocal reflector laser showing paths of reflected rays.

Referring to FIG. 5 and FIG. 6, there is shown an alternative embodiment of the invention. a flashlamp, for example a KrF flashlamp, is contained in a first tube 140. An anti-Stokes Raman medium, for example NaBr vapor, is contained in a second tube 142. Both tubes 140, 142 are located at foci of an elliptical confocal reflector 144. A pump laser 146, for example a fluorine $F_2$ discharge laser operating at 157 nm, directs a pump beam of photons 147 along the axis of the second tube 142 which contains the anti-Stokes Raman medium. Output laser light beams 148 and 150 are produced in the forward and backward directions respectively. Output laser light beams 148 and 150 are composed of anti-Stokes Raman photons 84, as shown in FIG. 1. Referring to FIG. 6, the paths of light rays 152 are shown traveling from flashlamp tube 140 located at a first focus 141 of elliptical reflector 144 to the laser tube 142 located at a second focus 143 of elliptical reflector 144 by reflection from any point within elliptical reflector 144. The confocal elliptical geometry is an efficient light focusing device because substantially all rays which leave flashlamp 140 and which do not exit from an end of reflector 144 will be reflected toward laser tube 142 because of the elliptical shape of reflector 144.

Particularly useful features of the invention are that other excited states of bromine, besides state 86 at 67,177 cm$^{-1}$, may be used to resonantly enhance the anti-Stokes Raman process, and the output photon wavelength may be tuned by tuning the pump beam 80. For example, the book by C. E. Moore, *Atomic Energy Levels, Vol. II*, published by the National Bureau of Standards as NSRDS-NBS 35, are sold by the Superintendent of Documents, U.S. Government Printing Office, Washington, D.C., provides a table at page 159 which lists over 75 energy states of atomic Br. Many of these energy states would be suitable to resonantly enhance a virtual transition reached through pumping from energy state 54, the $4p^5$ $^2P_{\frac{1}{2}}°$ state at 3685 cm$^{-1}$, in order to provide an anti-Stokes Raman laser. The output photon energy may be tuned by tuning the pump photon energy. A high efficiency of operation may be achieved by tuning the virtual transition near an appropriate excited energy state of Br. An appropriate energy level is anyone which provides an electric dipole transition in both the up-transition 80 and the down-transition 84, as shown in FIG. 1. Tuning range 81 is shown in FIG. 1. A similar tuning range exists in the vicinity of any appropriate energy state, as mentioned above.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. An anti-Stokes Raman laser comprising:
   a medium of molecules each of which contains at least one bromine atom, wherein said medium is chosen from the group consisting of:
   (a) $Br_2$
   (b) alkali bromides
   (c) $CH_3Br$
   (d) $C_3F_7Br$
   (e) organo bromides
   (f) Tl Br
   (g) NaBr;
   means for dissociating said at least one bromine atom from said molecules so that a majority of dissociated bromine atoms go into at least one excited metastable state; and
   means for pumping said bromine atoms in said at least one metastable state with pump photons in order to provide anti-Stokes Raman output photons by transition from said metastable state to a final state, said output photons having energy equal to the pump photon energy plus an energy gain given by the energy difference between said metastable state and said final state.

2. The apparatus as claimed in claim 1 wherein said means for dissociating said bromine atoms from said molecules comprises a light source which provides photons capable of photodissociating said molecules into said dissociated bromine atoms.

3. The apparatus as claimed in claim 1 wherein said means for pumping said bromine atoms with said pump photons comprises a fluorine laser which provides a 157 nm output photon.

4. The apparatus as claimed in claim 1 wherein said means for dissociating said at least one bromine atom from said molecules comprises a KrF flashlamp.

5. The apparatus as claimed in claim 1 wherein said means for dissociating said at least one bromine atom from said molecules comprises a KrF laser.

6. A process for producing coherent vacuum ultraviolet light comprising the steps of:
   (a) photodissociating an assembly of molecules each of which contains at least one bromine atom so that said at least one bromine atom is produced in an excited metastable state, and said assembly of molecules produces a population of atoms in said excited state;
   (b) pumping said population of atoms in said excited state with a pump photon beam so that a pump photon is absorbed and said atom makes a transition to a final state which is lower in energy than said metastable state with the emission of an output photon, and said output photon has an energy equal to the energy of said pump photon plus the energy difference between said metastable and said final state, wherein said assembly of molecules is selected from the group consisting of:
   (i) $Br_2$
   (ii) alkali bromides
   (iii) $CH_3Br$
   (iv) $C_3F_7Br$
   (v) organo bromides
   (vi) Tl Br
   (vii) NaBr.

7. The process as claimed in claim 6 wherein said metastable state is the bromine $4p^5\ ^2P_{\frac{1}{2}}^\circ$ state at 3685 $cm^{-1}$ and said final state is the bromine ground state $4p^5\ ^2P_{3/2}^\circ$ level.

8. The process as claimed in claim 7 wherein said step of photodissociating claimed in step (a) is done with a KrF laser.

9. The process as claimed in claim 7 wherein said step of photodissociating claimed in step (a) is done with a KrF flashlamp.

10. The process as claimed in claim 7 wherein step of pumping claimed in step (b) is done with a fluorine laser operating at a wavelength of 157 nm.

* * * * *